United States Patent
Huang et al.

(10) Patent No.: US 6,718,274 B2
(45) Date of Patent: Apr. 6, 2004

(54) INTEGRATED PC CARD HOST CONTROLLER FOR THE DETECTION AND OPERATION OF A PLURALITY OF EXPANSION CARDS

(75) Inventors: Yishao Max Huang, San Jose, CA (US); Sterling D. Du, Palo Alto, CA (US)

(73) Assignee: 2Micro International Limited, Georgetown (KN)

(*) Notice: Subject to any disclaimer, the term of this patent is extended or adjusted under 35 U.S.C. 154(b) by 22 days.

(21) Appl. No.: 10/047,419

(22) Filed: Jan. 15, 2002

(65) Prior Publication Data

US 2002/0111771 A1 Aug. 15, 2002

Related U.S. Application Data

(63) Continuation-in-part of application No. 09/536,578, filed on Mar. 28, 2000.
(60) Provisional application No. 60/147,544, filed on Aug. 5, 1999, provisional application No. 60/161,249, filed on Oct. 25, 1999, and provisional application No. 60/174,948, filed on Jan. 7, 2000.

(51) Int. Cl.[7] .................. G01R 19/00; G01R 25/00; G06F 3/00; G06F 13/00
(52) U.S. Cl. ..................... 702/64; 702/65; 710/13; 710/301
(58) Field of Search ................ 702/64, 65, 74, 702/117–120, 182, 183; 710/1, 8, 13, 14, 19, 301, 302

(56) References Cited

U.S. PATENT DOCUMENTS

| | | |
|---|---|---|
| 5,555,510 A | 9/1996 | Verseput et al. |
| 5,613,092 A | 3/1997 | Lim et al. |
| 5,634,132 A | 5/1997 | Pearce et al. |
| 5,636,347 A | 6/1997 | Muchnick et al. |
| 5,671,368 A | 9/1997 | Chan et al. |
| 5,708,799 A | 1/1998 | Gafken et al. |
| 5,727,168 A | 3/1998 | Inoue et al. |
| 5,758,099 A * | 5/1998 | Grieco et al. ............... 710/301 |
| 5,758,171 A | 5/1998 | Ramamurthy et al. |
| 5,761,732 A * | 6/1998 | Shaberman et al. ........ 711/157 |
| 5,773,901 A | 6/1998 | Kantner |
| 5,781,780 A | 7/1998 | Walsh et al. |
| 5,862,393 A | 1/1999 | Davis |
| 5,920,731 A | 7/1999 | Pletl et al. |
| 5,928,362 A | 7/1999 | Cardillo et al. |
| 5,943,482 A | 8/1999 | Culley et al. |
| 5,991,158 A | 11/1999 | Chan et al. |
| 6,052,742 A | 4/2000 | Kirinaka et al. |
| 6,062,480 A | 5/2000 | Evoy |
| 6,125,405 A * | 9/2000 | Farges ............................ 710/2 |
| 6,148,347 A | 11/2000 | Finch et al. .................. 710/14 |

(List continued on next page.)

FOREIGN PATENT DOCUMENTS

EP 0717341 6/1996

Primary Examiner—John Barlow
Assistant Examiner—Meagan S. Walling
(74) Attorney, Agent, or Firm—Grossman Tucker Perreault & Pfleger, PLLC

(57) ABSTRACT

A controller includes a plurality of readers for reading an associated plurality of expansion cards and for controlling operation of such expansion cards, wherein at least one of the plurality of readers is a flash media reader. A method for controlling the operation of at least one expansion card with an integrated controller having a plurality of readers includes detecting the presence of at least one expansion card, and enabling a selected reader of the integrated controller associated with at least one expansion card. Another method of writing data to read only memory in an integrated controller includes unlocking the read only memory, writing information into the read only memory, and locking the read only memory to prevent otherwise unintentional or unauthorized writing to the read only memory is also provided.

8 Claims, 12 Drawing Sheets

U.S. PATENT DOCUMENTS

| | | | |
|---|---|---|---|
| 6,151,647 A | 11/2000 | Sarat | 710/103 |
| 6,183,307 B1 | 2/2001 | Laity et al. | 439/676 |
| 6,184,592 B1 | 2/2001 | Rauhala et al. | |
| 6,438,638 B1 * | 8/2002 | Jones et al. | 710/301 |
| 6,480,097 B1 * | 11/2002 | Zinsky et al. | 340/5.8 |
| 6,535,420 B1 * | 3/2003 | Kawamata | 365/185.04 |

* cited by examiner

FIG. 5

| CD2#/CCD2# (PIN 67) | CD1#/CCD1# (PIN 36) | VS2#/CVS2 (PIN 57) | VS1#/CVS1 (PIN 43) | KEY | INTERFACE | VOLTAGE |
|---|---|---|---|---|---|---|
| GROUND | GROUND | OPEN | OPEN | 5V | 16-BIT PC CARD | 5V |
| GROUND | GROUND | OPEN | GROUND | 5V | 16-BIT PC CARD | 5V AND 3.3V |
| GROUND | GROUND | GROUND | GROUND | 5V | 16-BIT PC CARD | 5V, 3.3V AND X.XV |
| GROUND | GROUND | OPEN | GROUND | LV | 16-BIT PC CARD | 3.3V |
| GROUND | CONNECT TO CVS1 | OPEN | CONNECT TO CCD1# | LV | CARDBUS PC CARD | 3.3V |
| GROUND | GROUND | GROUND | GROUND | LV | 16-BIT PC CARD | 3.3V AND X.XV |
| CONNECT TO CVS2 | GROUND | CONNECT TO CCD2# | GROUND | LV | CARDBUS PC CARD | 3.3V AND X.XV |
| CONNECT TO CVS2 | GROUND | GROUND | CONNECT TO CCD2# | LV | CARDBUS PC CARD | 3.3V, X.X V AND Y.YV |
| GROUND | GROUND | GROUND | OPEN | LV | 16-BIT PC CARD | X.XV |
| CONNECT TO CVS2 | GROUND | CONNECT TO CCD2# | OPEN | LV | CARDBUS PC CARD | X.XV |
| GROUND | CONNECT TO CVS2 | CONNECT TO CCD1# | OPEN | LV | CARDBUS PC CARD | X.XV AND Y.YV |
| CONNECT TO CVS1 | GROUND | OPEN | CONNECT TO CCD2# | LV | CARDBUS PC CARD | Y.YV |
| GROUND | CONNECT TO CVS2 | GOUND | CONNECT TO CCD1# | | RESERVED | |
| GROUND | CONNECT TO CVS2 | CONNECT TO CCD1# | GROUND | | RESERVED | |

FIG. 7A

SMART CARD INTERFACE SIGNALS

| PCMCIA PIN | LEGACY DEVICES | | | | SMART CARD | |
|---|---|---|---|---|---|---|
| | 16-BIT PC CARD | | CARDBUS PC CARD | | SMART CARD | |
| | SIGNAL | I/O | SIGNAL | I/O | SIGNAL | I/O |
| 17, 51 | VCC | | VCC | | VCC | |
| 58 | RESET | O | CRST# | O | RESET | O |
| 47 | A18 | O | RESERVED | | CLOCK | O |
| 32 | D2 | I/O | RESERVED | | RVD_C4 | O |
| | GND | | GND | | GND | |
| 18 | VPP1 | | VPP1 | | VPP | |
| 16 | IREQ# | I | CINT# | I | I/O | I/O |
| 40 | D14 | I/O | RESERVED | | RVD_C8 | O |

FIG. 7B

SMART CARD DETECTION SIGNALS

| PCMCIA PIN | 16-BIT PC CARD | | CARDBUS PC CARD | | SMART CARD | |
|---|---|---|---|---|---|---|
| | SIGNAL | I/O | SIGNAL | I/O | SIGNAL | I/O |
| 63 | STSCHG# | — | CSTSCHG | I/O | SMART CARD | I/O |
| 36 | CD1# | — | CCD1# | — | CD1# | — |
| 43 | VS1# | — | CVS1# | I/O | VS1# | I/O |
| 57 | VS2# | — | CVS2# | I/O | VS2# | I/O |
| 67 | CD2# | — | CCD2# | — | CD2# | — |

INTEGRATED PC CARD HOST CONTROLLER FOR THE DETECTION AND OPERATION OF A PLURALITY OF EXPANSION CARDS

CROSS REFERENCE TO RELATED APPLICATIONS

The present application is a Continuation In Part of U.S. patent application Ser. No. 09/536,578 filed Mar. 28, 2000, which in turn claims benefit of U.S. Provisional Patent Applications Serial No's. 60/147,544, filed on Aug. 5, 1999; 60/161,249, filed on Oct. 25, 1999; and 60/174,948 filed on Jan. 7, 2000, the teachings of which are hereby incorporated by reference.

FIELD OF THE INVENTION

The present invention relates to an integrated controller for the detecting and operating one or more expansion cards. More specifically, the present invention relates to an integrated controller for detecting and controlling PC Cards (16-bit PCMCIA cards and 32 bit-CardBus cards), smart cards, and flash media cards. Particular utility of the present invention is to provide an integrated controller for mobile computing devices, e.g., laptop computers, etc, although other utilities are contemplated herein.

DESCRIPTION OF RELATED ART

The need for security and enhanced privacy is increasing as electronic forms of identification replace face-to-face and paper-based ones. The emergence of the global Internet, and the expansion of the corporate network to include access by customers and suppliers from outside the firewall, have accelerated the demand for solutions based on public-key technology. A few examples of the kinds of services that public key technologies enable are secure channel communications over a public network, digital signatures to ensure image integrity and confidentiality, and authentication of a client to a server (and visa-versa).

Smart cards are a key component of the public-key infrastructure that Microsoft is integrating into the Windows platform because smart cards enhance software-only solutions such as client authentication, logon, and secure e-mail. Smart cards are essentially a convergence point for public key certificates and associated keys because they provide tamper-resistant storage for protecting private keys and other forms of personal information; isolate security-critical computations involving authentication, digital signatures, and key exchange from other parts of the system that do not have a "need to know"; and enable portability of credentials and other private information between computers at work, home, or on the road.

It is estimated that the smart card will become an integral part of the Windows platform because smart cards will enable new breeds of applications in the same manner that the mouse and CD-ROM did when they were first integrated with the Personal Computer (PC). Incompatibility among applications, cards, and readers has been a major reason for the slow adoption of smart cards outside of Europe. Interoperability among different vendors' products is a necessary requirement to enable broad consumer acceptance of smart cards, and for corporations to deploy smart cards for use within the enterprise.

ISO 7816, EMV, and GSM

In order to promote interoperability among smart cards and readers, the International Standards Organization (ISO) developed the ISO 7816 standards for integrated circuit cards with contacts. These specifications focused on interoperability at the physical, electrical, and data-link protocol levels. In 1996, Europay, MasterCard, and VISA (EMV) defined an industry-specific smart card specification that adopted the ISO 7816 standards and defined some additional data types and encoding rules for use by the financial services industry. The European telecommunications industry also embraced the ISO 7816 standards for their Global System for Mobile communications (GSM) smart card specification to enable identification and authentication of mobile phone users.

While all of these specifications (ISO 7816, EMV, and GSM) were a step in the right direction, each was either too low-level or application-specific to gain broad industry support. Application interoperability issues such as device-independent APIs, developer tools, and resource sharing were not addressed by any of these specifications.

PC/SC Workgroup

The PC/SC (Personal Computer/Smart Card) Workgroup was formed in May 1996 in partnership with major PC and smart card companies: Groupe Bull, Hewlett-Packard, Microsoft, Schlumberger, and Siemens Nixdorf. The main focus of the workgroup has been to develop specifications that solve the previously mentioned interoperability problems. The PC/SC specifications are based on the ISO 7816 standards and are compatible with both the EMV and GSM industry-specific specifications. By virtue of the companies involved in the PC/SC Workgroup, there is broad industry support for the specifications and a strong desire to move them onto an independent-standards tract in the future.

Since its founding and initial publication of the specifications, additional members have joined the PC/SC Workgroup. New members include Gemplus, IBM, Sun Microsystems, Toshiba, and Verifone.

Microsoft's Approach

Microsoft's approach consists of the following:
A standard model for interfacing smart card readers and cards with PCs
Device-independent APIs for enabling smart card-aware applications
Familiar tools for software development
Integration with Windows and Windows NT platforms Having a standard model for how readers and cards interface with the PC enforces interoperability among cards and readers from different manufacturers. Device-independent APIs serves to insulate application developers from differences between current and future implementations. Device-independence also preserves software development costs by avoiding application obsolescence due to underlying hardware changes.

The most popular method currently being used to interface a smart card with a notebook computer is to use a PCMCIA Type II smart card reader/writer (FIG. 1). PCMCIA smart card readers are currently available from companies such as Gemplus, SCM Microsystems and Tritheim Technologies, to name a few. The end user cost for these smart card readers is typically around $150. The cost of the reader is a major portion to the cost of the overall security solution. The adapter card 104 in FIG. 1 depicts the major functional blocks of a conventional smart card reader. The PCIC Host Interface block of the smart card reader provides the electrical interface to the PC Card connector 106, which in turn connects to the PC Card controller 102. Additional logic is provided to control the interaction between the smart card and the software application. However, as noted above, this solution carries a significant per unit cost, and thus, is an unattractive alternative to large-scale migration to smart card compatibility.

Thus, there exists a need to provide an integrated host controller that provides PC Card, smart card, and Passive smart card adapter operability. Moreover, there exists a need to provide an integrated controller that can replace existing motherboard-mounted PC Card host controllers, without having to retool or redesign the motherboard.

SUMMARY OF THE INVENTION

A controller consistent with the present invention includes a plurality of readers for reading an associated plurality of expansion cards and for controlling operation of the associated plurality of expansion cards, wherein at least one of the plurality of readers is a flash media reader. The controller may also include at least one smart card reader and at least one PC card reader. The controller may also include a plurality of flash media readers and be further configured to be responsive to an input signal indicative of one selected flash media reader from among the plurality of flash media readers to enable one selected flash media reader. A personal computer (PC) configured to accept digital information from at least one expansion card may also include a controller consistent with the present invention.

A method consistent with the present invention for controlling the operation of at least one expansion card with an integrated controller having a plurality of readers includes: detecting the presence of at least one expansion card; and enabling a selected reader of the integrated controller associated with said at least one expansion card. The detecting step may further include detecting the presence of an expansion card using conventional PC Card specification signal lines including: determining the signal state of a first and second card detection signal line; determining the signal state of a first and second voltage select signal line; determining if the first and/or second card detection signal line, or said first and/or second voltage select signal line, comprise a signal state that is reserved by a PC Card signal specification; and determining the signal state of a predetermined unused PC Card signal line, relative to said reserved signal state.

Another method of writing data to read only memory in an integrated controller consistent with the present invention includes: unlocking the read only memory; writing information into the read only memory; and locking the read only memory to prevent otherwise unintentional or unauthorized writing to the read only memory.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 5 is a table of conventional PC Card detection and voltage sensing pin arrangements, and an example of the use of a pin arrangement for smart card detection employed by the controller of the present invention;

FIGS. 7A and 7B depict tables showing conventional PCMCIA assigned functional pins and their use for Smart Card interface and detection, respectively;

DETAILED DESCRIPTION OF EXEMPLARY EMBODIMENTS

Figure 2:
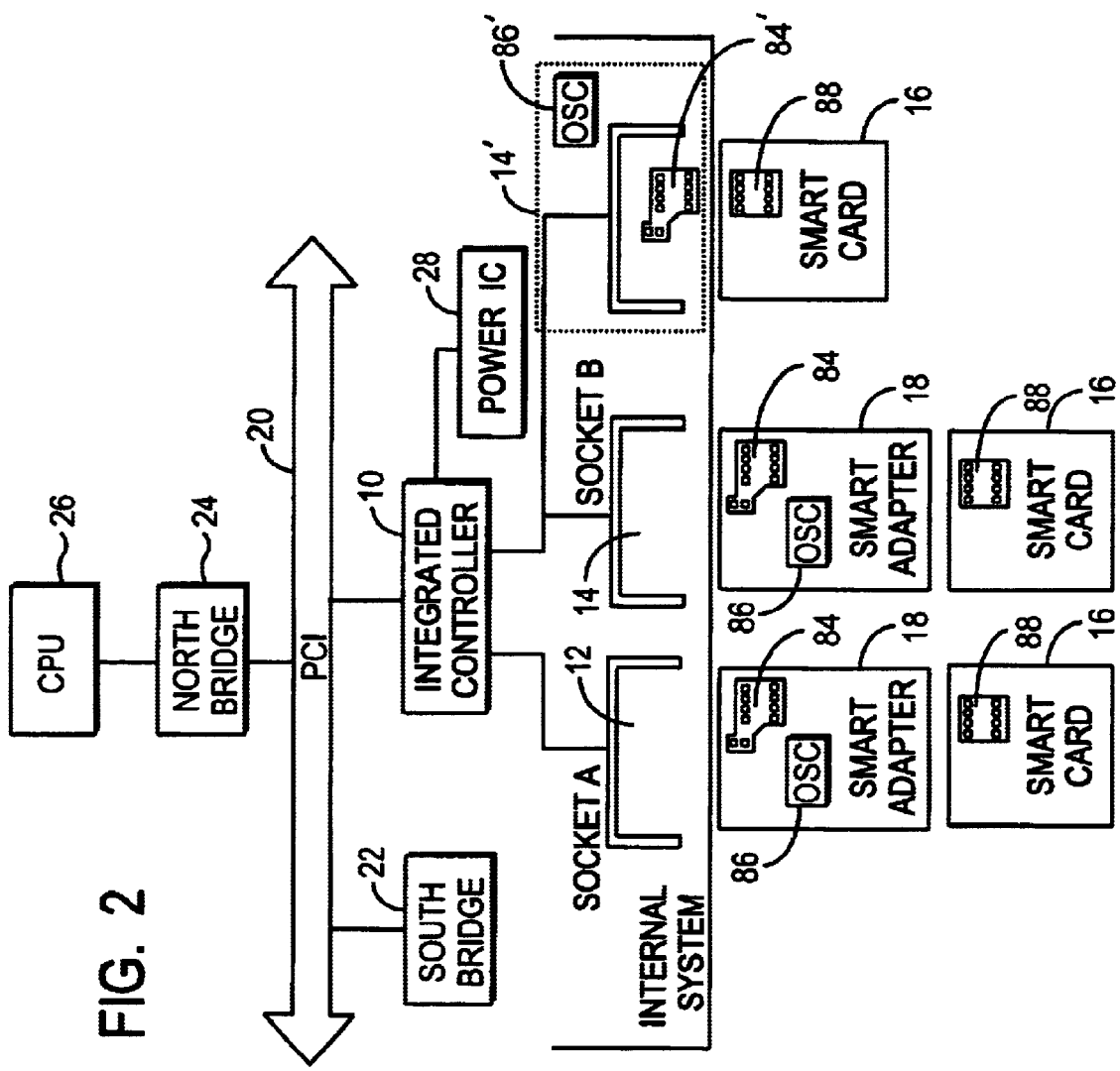
FIG. 2 is a system-level block diagram of the integrated smart card reader of the present invention.

FIG. 2 depicts a system-level block diagram of how the passive smart card adapter and a smart card interface with a host controller. The controller 10 is integrated into a PC platform, for example, laptop PC. As an example, the PC may be configured as shown, with the controller 10 operating to detect and control one or more expansion device cards that are inserted into Socket A 12 and/or Socket B 14. It will be understood that the controller 10 of present invention is adapted with the appropriate logic to drive PC Cards as well as smart cards. The PC system typically includes a processor 26 and a data bus 20. "North Bridge" logic 24 provides communication between the processor 26 and the bus 20. The controller 10, of the present invention is likewise adapted to communicate with the bus 20. In this example, the bus 20 is a PCI bus, however, any bus technology can be incorporated into the controller's logic. To complete the picture, "South Bridge" logic is provided for external bus communications, for example, legacy devices (ISA bus architecture), etc. South Bridge and North Bridge logic are well known in the art. Power IC chip 28 supplies the correct voltages (as determined by the card type inserted into Socket A or B) to the pins of the PC Card connector. Once the type of card is detected (based on the PC Card definitional table of FIG. 5, discussed below), chip 28 supplies the appropriate voltage for that card type.

In one embodiment, the present invention provides a passive smartcard adapter 18 which is configured to be inserted into either Socket A 12 or Socket B 14, which are in turn configured as either PC Card type I/II/III—type socket interface. The passive adapter 18 of this embodiment includes appropriate connector 84 and passive circuit 86. The smart card 16 inserted into the passive smart card adapter 18 also includes physical contacts 88 to interface with the physical connector 84 of the adapter. Pinout arrangements 84 and 88 of the adapter and smart card are dictated by the smart card specification, for example PC/SC compliant Smart card specification that meets ISO 7816 electrical specifications and T=0, T=1 protocols. In this embodiment the use of an adapter 18 permits smart card readability and operability without retooling the PC case to include a specific smart card socket. Alternatively, the PC can include a smart card slot 14' as shown in FIG. 2. In this alternative embodiment, the logic 86' and connector 84' are, of course, provided internally within socket 14'.

Figure 3:
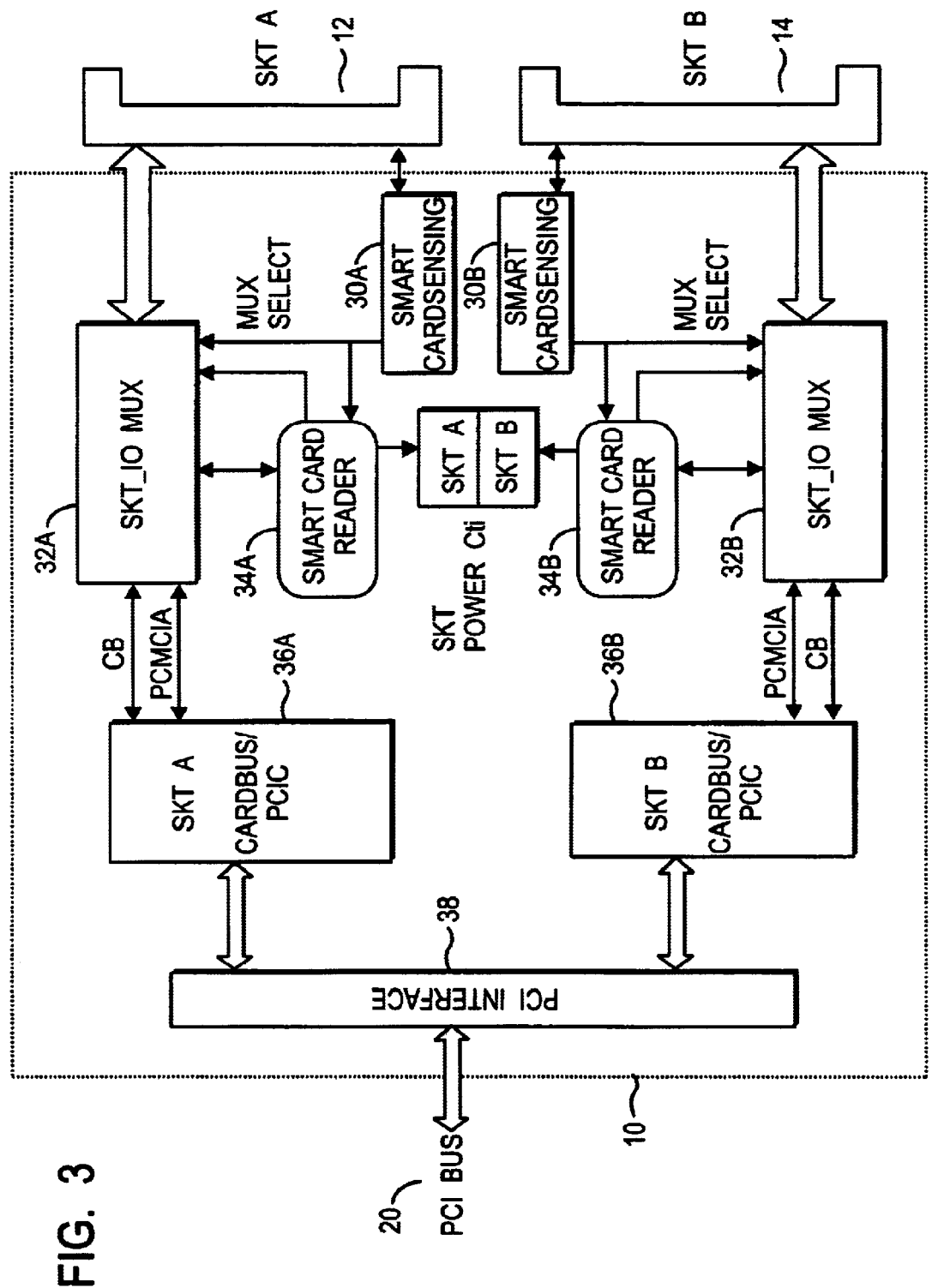
FIG. 3 is a detailed block diagram of the integrated Smart card reader of the present invention.

Referring now to FIG. 3, a more detailed block diagram of the integrated controller 10 is depicted, showing those logic portions directed to smart card detection and operability. In this example, the controller 10 includes smart card sensing logic 30A and 30B, Smart card multiplexer (MUX) logic 32A and 32B, Smart card reader logic 34A and 34B and interface logic 36A and 36B.

It should be noted at the outset that FIG. 3 depicts only the logic associated with smart card and Passive smart card adapter detection and operability, and it should be understood that controller 10 includes additional logic (not shown) to permit detection and operation of conventional PC Card's. Conventional PC Card controllers detect the type of card inserted into a slot using a set of card detection pins, CD1 and CD2, and a set of voltage sense pins VS1 and VS2. The coupling combinations between these pins (with reference to ground) indicate to the appropriate logic which type of card has been inserted into the socket. For example, as shown in the table of FIG. 5, the coupling combination of CD1, CD2, VS1 and VS2 determine whether the PC Card inserted is a 16-bit PCMCIA card or a 32-bit CardBus card. Moreover, as is shown in the table, this combination also determines the driving voltage for the particular type of card. For example, 3.3 V, 5 V, X.X V and Y.Y V. In the last two rows of the table of FIG. 5, it is to be noted that the listed combinations of CD1, CD2, VS1 and VS2 are reserved in the PC Card specification. The present invention utilizes one of these reserved combinations of CD1, CD2, VS1 and VS2, and additionally uses a status change signal, STSCHG, to indicate whether a smart card has been inserted into the slot (either directly, or via an adapter). The status change signal is preferably used in the present invention since this signal is not utilized during the detection process for conventional PC Card cards, and is only used once the card type is known.

Figure 4:
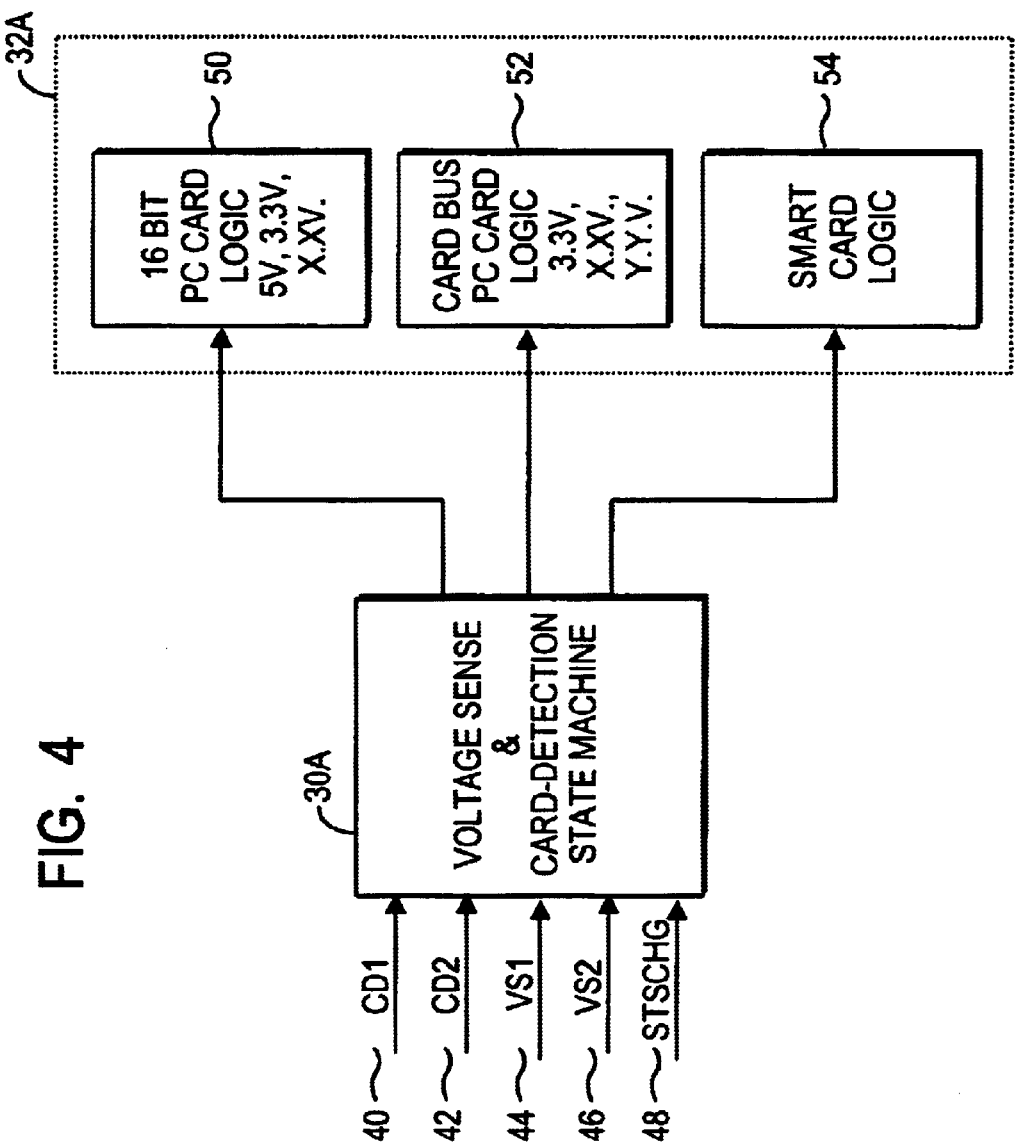
FIG. 4 is a state machine block diagram of the integrated Smart card reader of the present invention.

Thus, in one sense, the smart card sensing logic 30A shown in FIG. 3 can be viewed as a state machine that determines the type of card inserted into a socket. To that end, and referring to FIG. 4, a state machine representation of the card sensing logic 30A of FIG. 3 is depicted. As is shown, the card sensing logic 30A accepts as inputs CD1, CD2, VS1, VS2 and status change (labeled 40, 42, 44, 46 and 48, respectively). In accordance with the reserved arrangement of CD1, CD2, VS1, VS2 as shown in FIG. 5, and the addition of the status change signal, the state machine 30A determines the appropriate logic 32 A for communicating with the given type of card. For example, certain combinations of CD1, CD2, VS1, VS2 (as indicated in FIG. 5) will dictate that the card inserted into the socket is either a 16-bit PC card or a 32-bit CardBus PC card. Accordingly, the state machine 30A will activate the appropriate logic 50 or 52 for the given card type. It should also be noted that the particular voltage of the inserted card is also determined using the combination of these four pins.

Extending the capabilities of conventional PC Card controllers, the present invention also monitors the STSCHG pin to determine if a smart card or a passive smart card adapter has been inserted into the socket, and likewise activates the appropriate logic 54 to communicate with the smart card, for example, logic 32A as shown in FIG. 3. To determine the states of CD1, CD2, VS1, VS2 and STSCHG, the card sensing logic 30A can produce, for example, a pulse train signal on selected ones of these pinouts, and by monitoring the signal on one or more of the other pins (with respect to ground), it can then be determined the card type inserted into the socket.

The smart card sensing logic 30A and 30B operate to detect both a smart card or a passive smart card adapter and PC Cards, based on the Table in FIG. 5. The pin assignments shown in FIG. 5 are designated by the PC Card specification, and are conventional pin assignments for these signal lines. The identity of the card is determined by the values of the voltages of columns 1–4, i.e., CD2, CD1, VS2 and VS1. Both smart card and passive smart card adapter detection operates by utilizing the reserved combinations of these pins, plus the use of an additional pin, for example, STSCHG signal line. The concept is summarized in the Table of FIG. 7B. This table shows the pins used to detect PC Cards, smart cards and Passive smart card adapter cards. The signal column for smart card or passive smart card adapter detection includes one of the reserved areas for CD1, CD2, VS1 and VS2, as shown in the last two rows of Table of FIG. 5. It should be noted that although the figures depict the use of signal line STSCHG (which is provided by the conventional PC Card specification), the present invention, generally, could use any pin in the PC Card specification that is unused during the card detection sequence. In other words, from a timing perspective, certain signal lines in the PC Card specification remain unused during the card detection process. The present invention utilizes one (or more) of these signal lines, in conjunction with the reserved combination of CD1, CD2, VS1, and VS2, to effectuate smart card or passive smart card adapter detection. Thus, the figures represent only one of many examples for the use of an additional signal pin that could be used for smart card detection.

Figure 6:
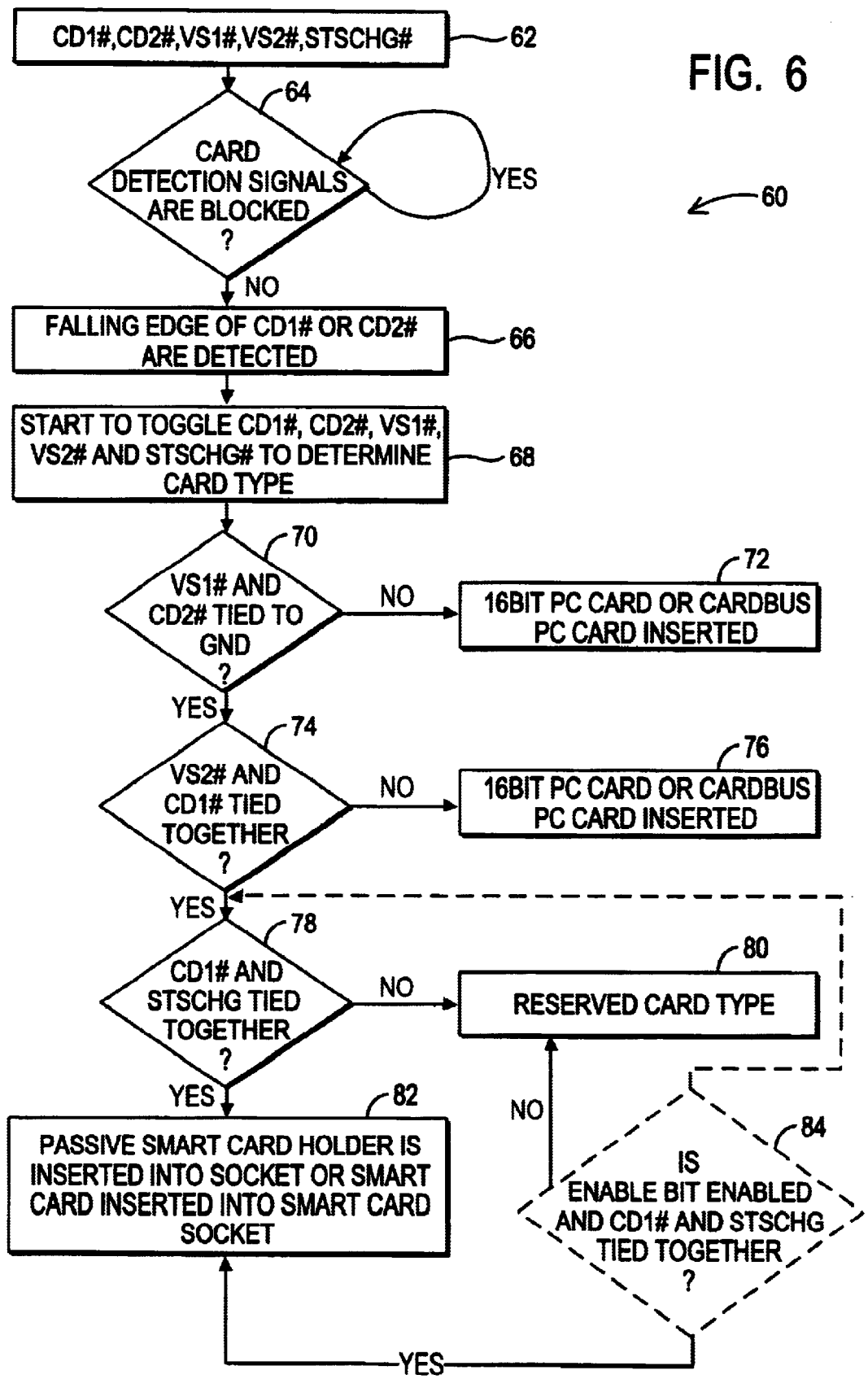
FIG. 6 is a flowchart of an exemplary smart card and passive smart card adapter detection scheme of the present invention.

A flow chart 60 of the card-type detection process is depicted in FIG. 6. For clarity, the corresponding reference numerals of the logic to detect and operate PC Card, smart card and passive smart card adapter cards (as shown in FIGS. 2 and 3) are omitted. Initially, the detection logic seeks the presence of CD1, CD2, VS1, VS2, and STSCHG 62. If not present, or otherwise unavailable, it is assumed the no card has been inserted into a socket, and thus the card detection signals (CD1 and CD2) are blocked 64. Once a card is inserted, the detection logic monitors the falling edge of CD1 or CD2 66. This is dictated by the PC Card specification for determining the presence of a card. Once a card is detected, the detection logic of the present invention toggles CD1, CD2, VS1, VS2, and STSCHG to determine the type of card inserted 68. Toggling, as cited above, can be in the form of a pulse train signal, or other toggling signal. The detection logic proceeds by polling CD1, CD2, VS1, VS2, and STSCHG in the following manner. First, the logic determines if VS1 and CD2 are tied to ground 70. If not, it is known that a 16-Bit PCMCIA Card or 32-bit CardBus card is inserted 72, as indicated by the table of FIG. 5. If yes, the logic determines if VS2 and CD1 are tied together 74. If this is not the case, again it is known that a 16-Bit Card or 32-bit CardBus card is inserted 76, as indicated by the table of FIG. 5. If it is determined that CD1 and STSCHG are tied together 78, then it is determined that a smart card or a passive smart card adapter is present. Either the passive smart card adapter is inserted into the socket, or a smart card is inserted directly into a smart card socket 82.

Another feature of the present invention is to provide an integrated controller circuit 10, which can be directly integrated with current PC Card controller logic. Conventional PC Card controller logic is an IC package that is mounted directly on the motherboard, which has 208 pins, and each of these pins is assigned by the PC Card specification. Another feature is to provide a controller 10 that can directly replace conventional controllers, without having to reconfigure pin assignments, add additional pin configurations, alter the motherboard, or change the tooling required. To that end, and referring to the table of FIG. 7A, the controller 10 of present invention includes both conventional, legacy interface card signals and smart card signals. As is shown in this table, the same pins (leftmost column) used to interface with conventional 16 and 32 cards are likewise used to interface with the smart card. Thus, no additional pins are required. Referring again to FIG. 3, if a smart card is detected into a socket, logic 30A or 30B communicates with and enables logic 34A or 34B, to enable smart card readability. Logic 34A and 34B enable the socket MUX logic 32A or 32B, so that the socket (A or B) can communicate with the cardbus/PCI controller logic 36A or 36B, which communicate with the PCI bus 20 (via PCI interface 38). As should be understood, the smart card logic 30A, 30B, 34A and 34B of the present invention directly interfaces with the MUX logic 32A and 32B and communicates with bus interface controllers 36A and 36B using conventional PC Card communication protocols. If a conventional card is inserted into a socket (socket A or B), then conventional logic (not shown) incorporated into the controller 10 activates MUX 32A and 32B and communicates with bus interface controllers 36A and 36B using conventional PC Card communication protocols.

To facilitate direct integration with conventional PC Card logic sets, the present invention controls a predetermined number of pre-assigned pins to effectuate smart card communication. For example, as shown in FIG. 7A, pins 17, 51, 58, 47, 32, GND, 18, 16 and 40, as specified by the PC Card standard, are utilized by the present invention to operate both smart cards and PC cards. Therefore, no extra pins are required by the controller 10 to effectuate Smart card operability. In operation, once the smart card has been detected (as described above with reference to FIGS. 3–6), logic 34A or 34B reassigns the operability of the PC Card pins noted in FIG. 7A to effectuate Smart card readability. The signal assignments, set forth under the smart card Signal column of FIG. 7A, are the required signals to read smart Cards.

The table and FIG. 7A is included as a lookup table in the controller 10 of the present invention to operate PC Cards. Likewise, the tables of FIG. 5 and FIG. 7B are included as lookup tables in the controller 10 for the detection of PC Cards and smart Cards. To this end, and view the logic sets 30A and 30B as a state machine (shown in FIG. 4), the state machine compares the input signals to the lookup tables of FIGS. 5 and 7B to couple the appropriate logic to the card.

Those skilled in the art will recognize that CD1, CD2, VS1 and VS2 comprise card detect and voltage select signals, respectively, as specified by the conventional PC Card signal specification. In the tables of FIGS. 5, 7A and 7B, and the flowchart of FIG. 6, the nomenclature used for these signal lines includes, for example, CD1#, CD2#, VS1#, VS2#, etc., which are the formal names for these conventional signal lines. However, it should be apparent that the use of CD1, CD2, VS1 and VS2 are shorthand versions of these formal names, and may be used interchangeably.

Thus, it is evident that there has been provided an integrated Smart card controller and Smart card detection process that satisfies the aims and objectives stated herein. It will be apparent to those skilled in the art that modifications are possible. For example, although the present invention has been described with reference to detection and operation of smart Cards, the present invention is equally adapted for the detection and operation of any type of expansion cards, in addition to conventional PC Cards. Other modifications are possible. For example, it may be desirable to include a software lock on the operability of the smart card logic shown herein. Accordingly, the logic depicted in FIG. 3 can include an enable bit, which selectively turns on and off smart card detectability and operability. To that end, and referring to FIG. 6, the smart card detection process may alternatively include the step of determining if an enable bit is enabled, and if CD1 and STSCHG are tied together 84. If this is not the case, the smart card the logic will not detect the presence of a smart card. This feature of the present invention permits, for example, manufacturers to offer smart card compatibility as an upgrade option, while still integrating the core logic of the controller 10.

As earlier indicated, the present invention, although first described with reference to detection and operation of smart cards and PC cards, is equally adapted for the detection and operation of a variety of expansion cards. For instance, in another embodiment consistent with the present invention a controller 10A may also be adapted detect and operate one or a plurality of flash media cards.

Flash media cards may be used with various "digital appliances" and have a variety of different shapes, capabilities, and storage capacities. For example, a digital video camcorder, a digital camera, portable music player, personal digital assistant (PDA), or the like are examples of some "digital appliances" that store digital information on various flash media cards. Some types of flash media cards include SmartMedia™, CompactFlash™, and Memory Stick® cards. In order to transfer such stored digital information to and from a PC, various flash media readers need to be utilized.

Figure 1:
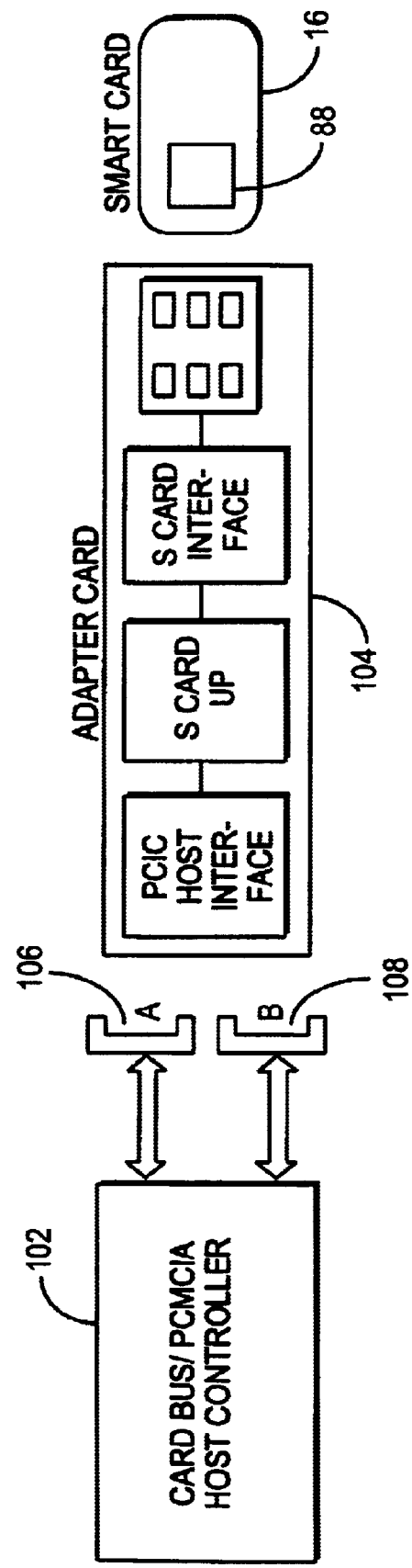
FIG. 1 depicts a block diagram of a conventional solution to incorporate smart card operability for PC applications.

Like the smart card example previously described with reference to FIG. 1, the standard method to interface a flash media card with a PC is to use an associated external reader/writer corresponding to the particular flash media card with a dedicated connector. For example, a Memory Stick® flash media card may have its own associated Memory Stick® compatible flash reader. This requires users of various digital appliances to purchase and utilize a separate flash media reader in order to transfer digital information to and from their PC. In addition, each reader also typically utilizes its own specific ASIC to interface with each of the various flash media cards. This standard solution typically requires multiple flash media readers, multiple ASICs, and dedicated connectors for each flash media card. Some flash media readers may be capable of reading two or more different flash media cards.

Figure 8A:
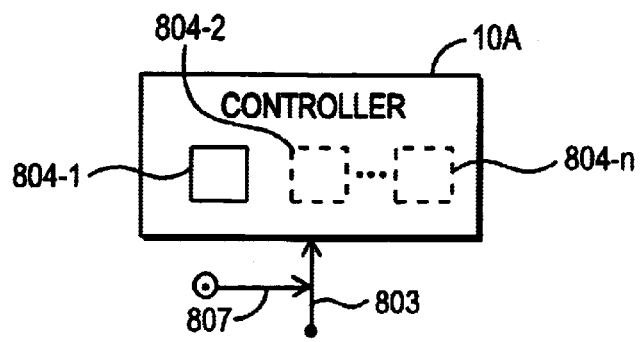
FIG. 8A depicts another embodiment consistent with the present invention illustrating a controller having one or a plurality of flash media readers responsive to an input signal.

Advantageously, as illustrated in FIG. 8A, a controller 10A consistent with the present invention includes one or a plurality of flash media readers 804-1, 804-2, . . . 804-n for reading and controlling an associated plurality of flash media cards. This enables one integrated controller 10A to be able to control an associated plurality of flash media cards. Having one integrated controller 10A with a plurality of flash media readers 804-1, 804-2, . . . 804-n also permits the specific external flash media readers with associated ASICs and dedicated connectors, as detailed earlier, to be eliminated. In addition, the same integrated controller 10A may be equipped with detecting and controlling means to detect and control PC cards (16 Bit PCMCIA cards and 32 bit-CardBus cards) and smart cards as previously described.

The controller 10A may be responsive to an input signal delivered to the controller 10A via an input path 803. The input signal may be indicative of a particular expansion card, and the controller may further act based upon the input signal to enable and/or disable various flash media readers 804-1, 804-2, . . . 804-n as later more fully described.

The controller 10A may also permit a selected reader to be chosen from the plurality of flash media readers 804-1, 804-2, . . . 804-n for individual testing. For example, a separate test signal may be coupled via a test path 807 to the input path 803 indicating which selected reader is to be tested. In this case, the subject reader may be enabled for testing purposes.

Figure 8B:
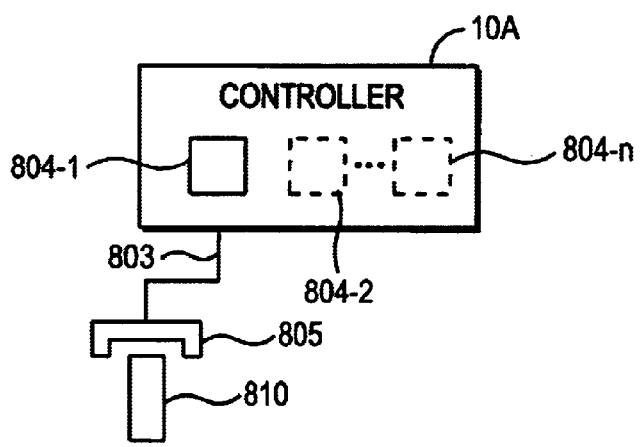
FIG. 8B depicts one method for generating the input signal of FIG. 8A based on one particular socket, which accepts one particular expansion card.

Turning to FIG. 8B, the input signal delivered via the input path 803 may also be based on a particular flash media card 810 and corresponding socket 805. The socket 805 may be further coupled to the motherboard of an associated PC. For instance, the socket 805 may be a Memory Stick® socket configured to accept only a specific card 810 such as Memory Stick® flash media card. Once the Memory Stick Memory Stick® flash media card is coupled to the socket 805, the input signal indicates the presence of that specific card. Those skilled in the art will recognize various ways to trigger the input signal based on detecting the presence of the expansion card 810.

Figure 8C:
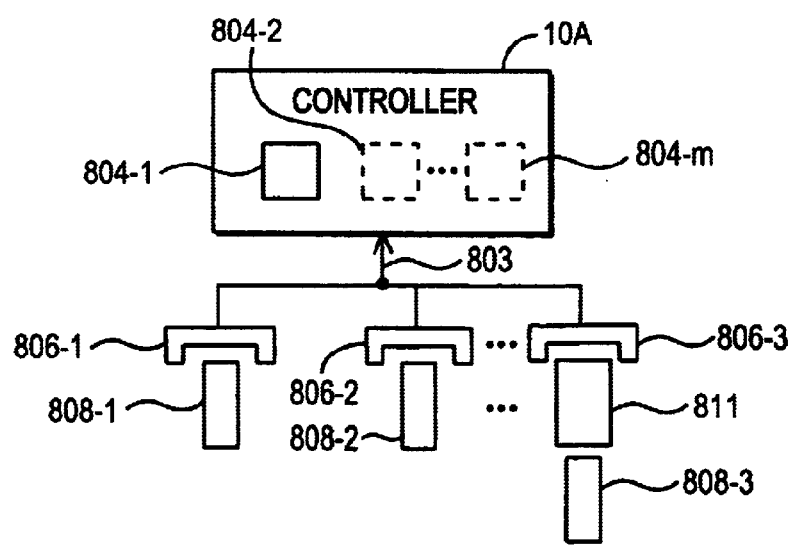
FIG. 8C depicts another method for generating the input signal of FIG. 8 based on a plurality of sockets.

In addition, as space and other considerations permit, the controller 10A may also be coupled to a plurality of sockets, which are further coupled to the motherboard of an associated PC. Three exemplary sockets 806-1, 806-2, 806-3 are illustrated in FIG. 8C. Some sockets 806-1, 806-2 may be further configured to accept an associated expansion card 808-1, 808-2. The input signal may then be responsive to those sockets 806-1, 806-2 to indicate when one or more of those sockets have been engaged with its associated expansion card 808-1, 808-2. For example, one socket 806-1 may be configured to accept a Memory Stick® flash media card, while another socket 806-2 may be configured to accept a SmartMedia™ flash media card. If a Memory Stick® flash media card is inserted into one socket 806-1, an input signal, responsive to this condition, is delivered to the controller 10A via the input path 803 indicating to the controller 10A the presence of such a card. Again, those skilled in the art will recognize a variety of different ways to detect the physical presence of such a card in such a slot.

In addition, another socket 806-3 may be a standard PC card type I/II/III interface. Such interfaces may accept a passive adapter 811 that may further accept a variety of expansion cards 808-3. As previously detailed, such an adapter 811 may include a smart card socket to accept a smart card. Other types of passive adapters 811 may fit into the same PC Card interfaces and accept flash media cards, e.g., a Memory Stick® adapter may accept a Memory Stick® card and connect to a standard PC Card type interface.

Figure 9:
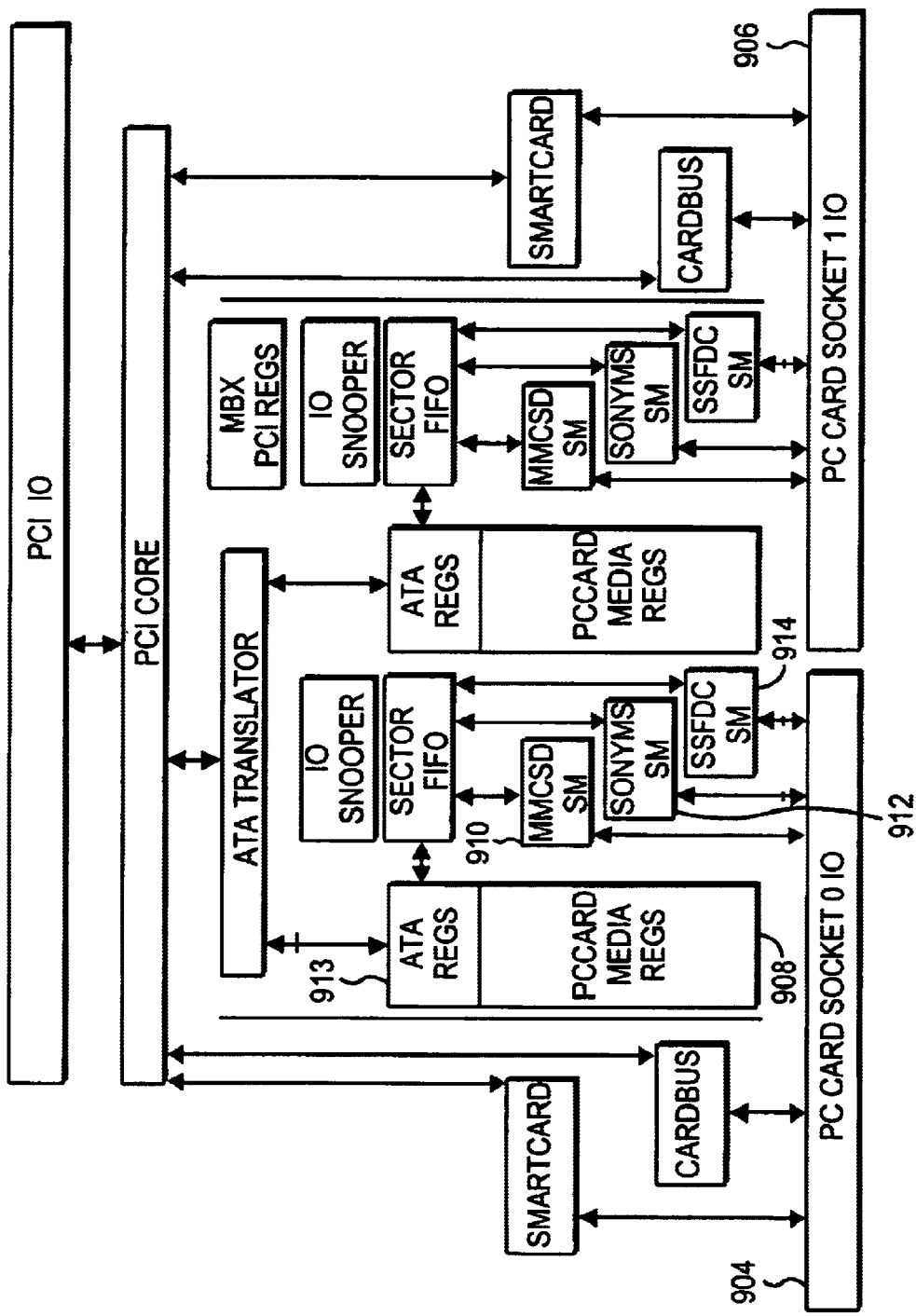
FIG. 9 is a more detailed block diagram illustrating another exemplary embodiment of a controller having two flash media readers and two PC Card type I/II/III type socket interfaces.

Turning to FIG. 9, a more detailed block diagram of one exemplary embodiment of integrated controller 10A is illustrated. As illustrated, a PC card (16 Bit PCMCIA cards and 32 bit-CardBus cards), or a passive adapter further accepting a smart card or flash media card may be coupled to card socket 904 or 906. The PC Card and smart card detection and operation capabilities are similar to as previously described with reference to FIGS. 3–7. The controller 10A may also include a variety of flash media logic 910, 912, and 914 and registers to control connection between a flash media card and the host system. For example, such logic may be provided to read SmartMedia™, CompactFlash™, and Memory Stick® cards.

A controller 10A consistent with the present invention may also be configured to enable a selected reader and disable other readers. Advantageously, this permits power savings and simplifies operation of the integrated controller 10A. In addition, it also permits selected readers to be individually tested as earlier detailed.

In order to enable a specific flash media reader, a SEEPROM external to the integrated controller 10 may be utilized. The SEEPROM may load data information to the read only configuration registers when the system power is turned on. This data information may include a variety of different information such as PC manufacturer information and system configuration instructions including information indicating which reader should be enabled, and which readers should be disabled.

A preferable method of enabling a specific flash media reader may be to include software to program configuration registers 908 in the integrated controller 10A based on the input signal delivered over the input path 803. To accomplish this, the read only registers 908, in particular the "socket-on-demand" registers, may be programmed with values that would otherwise be stored in the external SEEPROM. Programming the registers may take place during a certain state, e.g., a "power-on" reset state, or may take place at some other time as described further below.

Figure 10:
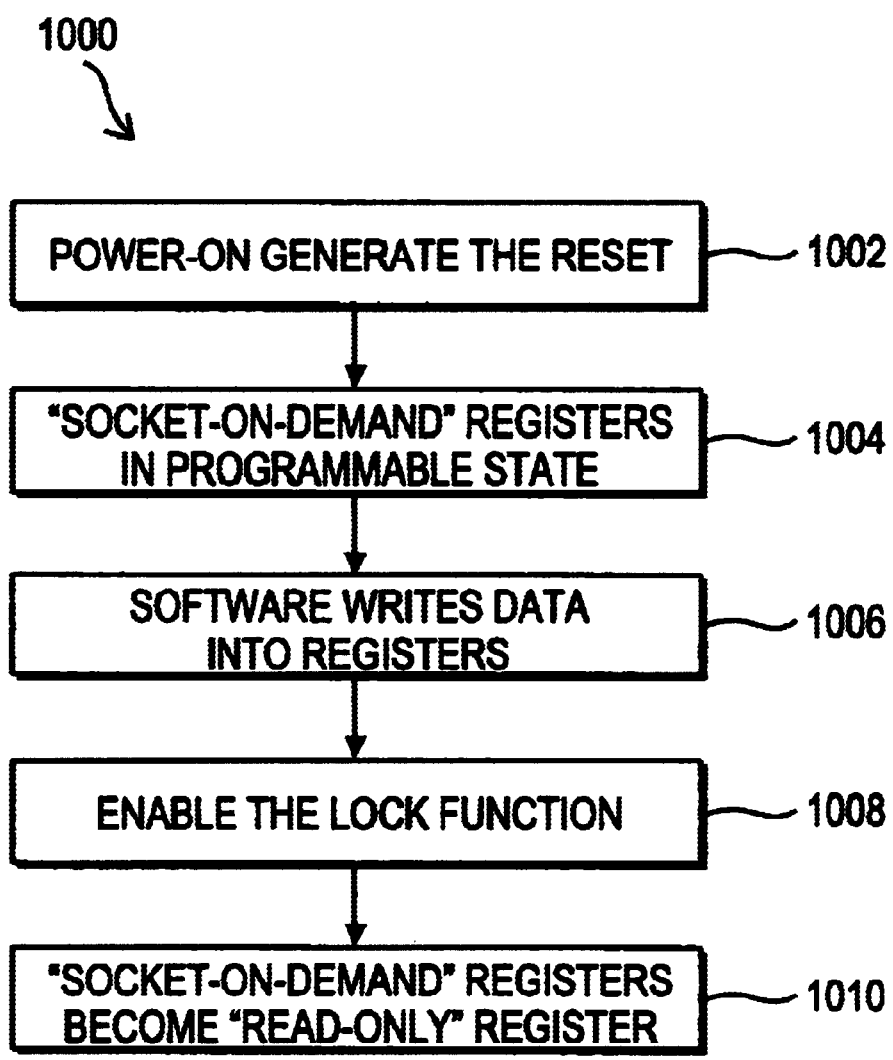
FIG. 10 is an exemplary flow chart illustrating a method for programming data to a read only memory in a controller when the controller is in a "power-on" state.

Turning, for example to FIG. 10, a flow chart 1000 illustrates how data may be written into the registers during a certain state, e.g., a "power-on" state. In the first step 1002 the power-on state is activated, which generates a RESET function. At this time, the "socket-on-demand" registers are in the programmable state as indicated in step 1004. In the next step 1006, a software routine consistent with the present invention writes data into the registers. This data may include customer specific OEM data that would otherwise be stored in SEEPROM. This data may also include information on the detected or selected expansion card as earlier detailed.

Subsequently, a lock function may be enabled 1008 to prevent subsequent writing, otherwise unintentional or unauthorized, into the registers. A lock function may be a predetermined one-lock bit, a predetermined read/write lock sequence, or a predetermined data lock pattern. Thereafter, the "socket-on-demand" registers become "read-only" registers 1010.

Figure 11:
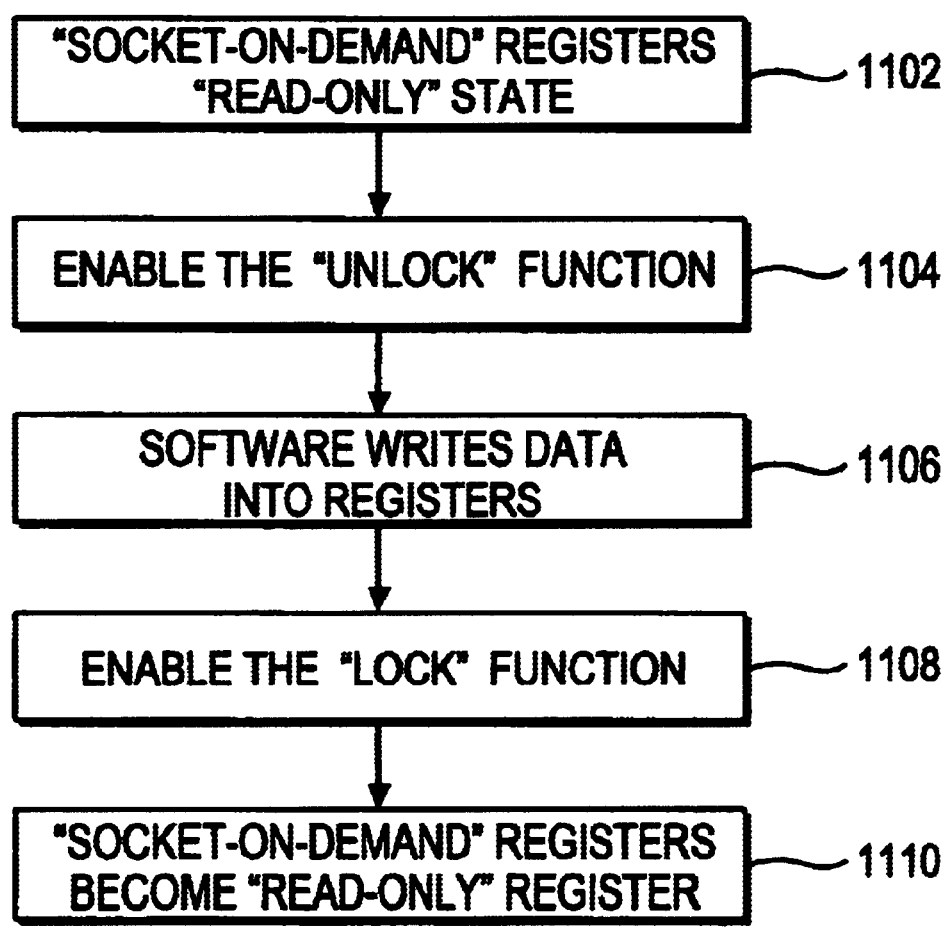
FIG. 11 is an exemplary flow chart illustrating a method for programming data to a read only memory in a controller when the controller is not in a "power-on" state.

Turning to FIG. 11, the "socket-on-demand" registers may remain in the read-only state 1102 until the power-on reset function is enabled again, or until an "unlock" function is enabled 1104. An unlock function may include a predetermined unlock bit, a predetermined read/write sequence, or a predetermined data unlock sequence of bits.

After the unlock function is enabled, software consistent with the present invention writes data into the registers in the next step 1106. For example, a three-bit data sequence could be utilized to provide instructions to the controller on enabling or disabling certain flash media readers. A "000" sequence may disable all flash readers, while a "001" sequence may enable a particular flash media reader. The flash media reader may be enabled in response to a test signal or in response to detection of a particular flash media card in a particular socket. Then, similar to the earlier described process, a lock function is enabled 1108 to prevent unwanted writing into the registers. Therefore, the "socket-on-demand" registers become "read-only" registers 1110.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A method of controlling the operation of at least one expansion card with an integrated controller having a plurality of readers including at least one flash memory reader, said method comprising: detecting the presence of said at least one expansion card; and enabling a selected reader of said integrated controller associated with said at least one expansion card; unlocking read only memory in said integrated controller; and writing data into said read only memory indicating which reader to enable based on the results from said detecting step.

2. The method of claim 1, wherein said detecting step detects the presence of at least one said flash media card.

3. The method of claim 1, further comprising the step of disabling all other non selected readers of said integrated controller.

4. The method of claim 1, wherein said enabling step further comprises;

locking said read only memory to prevent otherwise unintentional or unauthorized writing to said read only memory.

5. The method of claim 1, wherein said detecting step includes detecting the presence of said expansion card using conventional PC Card specification signal lines comprising:

determining the signal state of a first and second card detection signal line;

determining the signal state of a first and second voltage select signal line;

determining if said first and/or second card detection signal line, or said first and/or second voltage select signal line, comprise a signal state that is reserved by a PC Card signal specification; and determining the signal state of a predetermined unused PC Card signal line, relative to said reserved signal state.

6. The method of claim 5, further comprising the steps of:

determining the presence of a smart card by determining whether said first card detection signal and said second voltage select signal are tied together.

7. The method of claim 5, wherein said steps of determining the signal states of said signal lines comprise polling said signal lines with a predetermined input signal and measuring in output signal.

8. The method of claim 5, wherein said detecting step detects the presence of a flash media card based on the presence of said flash media card in an associated type of socket.

* * * * *

UNITED STATES PATENT AND TRADEMARK OFFICE
CERTIFICATE OF CORRECTION

PATENT NO.   : 6,718,274 B2
DATED        : April 6, 2004
INVENTOR(S)  : Huang et al.

It is certified that error appears in the above-identified patent and that said Letters Patent is hereby corrected as shown below:

Title page,
Item [73], Assignee, "2Micro International Limited, Georgetown (KN)" should read
-- O2 Micro International Limited, Grand Cayman, Cayman Island B.W.I. (KY) --

Column 11,
Line 19, "least one expansion card; and enabling a selected reader of" should read -- least one expansion card; enabling the selected reader of --.

Signed and Sealed this

Twelfth Day of October, 2004

JON W. DUDAS
*Director of the United States Patent and Trademark Office*